US012574844B2

(12) United States Patent
Yang et al.

(10) Patent No.: US 12,574,844 B2
(45) Date of Patent: Mar. 10, 2026

(54) METHOD FOR DATA OBTAINING AND COMMUNICATION DEVICE

(71) Applicant: SPREADTRUM SEMICONDUCTOR (CHENGDU) CO., LTD., Chengdu (CN)

(72) Inventors: Pengfei Yang, Chengdu (CN); Wengang Cheng, Chengdu (CN)

(73) Assignee: SPREADTRUM SEMICONDUCTOR (CHENGDU) CO., LTD., Chengdu (CN)

( * ) Notice: Subject to any disclaimer, the term of this patent is extended or adjusted under 35 U.S.C. 154(b) by 453 days.

(21) Appl. No.: 18/041,601

(22) PCT Filed: Jul. 15, 2021

(86) PCT No.: PCT/CN2021/106468

§ 371 (c)(1),
(2) Date: Feb. 14, 2023

(87) PCT Pub. No.: WO2022/033266

PCT Pub. Date: Feb. 17, 2022

(65) Prior Publication Data

US 2023/0292241 A1    Sep. 14, 2023

(30) Foreign Application Priority Data

Aug. 14, 2020    (CN) ......................... 202010822676.4

(51) Int. Cl.
*H04W 52/02* (2009.01)

(52) U.S. Cl.
CPC ... *H04W 52/0225* (2013.01); *H04W 52/0235* (2013.01); *H04W 52/0209* (2013.01)

(58) Field of Classification Search
CPC ......... H04W 52/0225; H04W 52/0206; H04W 52/0216; H04W 52/0229; H04W 52/0241;
(Continued)

(56) References Cited

U.S. PATENT DOCUMENTS 7,613,139 B1 * 11/2009 Wang .................... H04W 24/00
455/574
8,971,229 B1   3/2015 Yenganti et al.
(Continued)

FOREIGN PATENT DOCUMENTS

CN       1917401 A      2/2007
CN     101282141 A     10/2008
(Continued)

OTHER PUBLICATIONS

WIPO, International Search Report and Written Opinion for International Application No. PCT/CN2021/106468, Sep. 27, 2021.
(Continued)

*Primary Examiner* — Michael K Phillips
(74) *Attorney, Agent, or Firm* — HAUPTMAN HAM, LLP

(57) ABSTRACT

A method for data obtaining and a communication device are provided. The method includes: setting a data obtaining mode to a first data obtaining mode; receiving at least one beacon frame and at least one null frame from a wireless access device; determining a first quantity and a first ratio according to the at least one beacon frame and the at least one null frame received; and switching the data obtaining mode from the first data obtaining mode to a second data
(Continued)

410. Set a data obtaining mode to a first data obtaining mode

420. Receive at least one beacon frame and at least one null frame transmitted by a wireless access device 430. Determine a first quantity and a first ratio according to the at least one beacon frame and the at least one null frame received 440. Switch the data obtaining mode from the first data obtaining mode to a second data obtaining mode, if determining according to the first quantity and the first ratio that a terminal device satisfies a switching condition obtaining mode, in response to determining according to the first quantity and the first ratio that a switching condition is satisfied.

18 Claims, 6 Drawing Sheets

(58) Field of Classification Search
CPC .......... H04W 52/0235; H04W 52/0209; Y02D 30/70; H04L 5/0053
See application file for complete search history.

(56) References Cited

U.S. PATENT DOCUMENTS

| | | | | |
|---|---|---|---|---|
| 2008/0181156 | A1* | 7/2008 | Ecclesine | .......... H04W 52/0235 370/311 |
| 2008/0225768 | A1* | 9/2008 | Wentink | ............ H04W 52/0216 370/311 |
| 2010/0067423 | A1 | 3/2010 | Sun et al. | |
| 2012/0021737 | A1 | 1/2012 | Luo | |
| 2012/0106418 | A1 | 5/2012 | Khafa et al. | |
| 2016/0242195 | A1* | 8/2016 | Kwon | ................. H04L 25/0204 |
| 2017/0033898 | A1* | 2/2017 | Chun | ................... H04B 7/0417 |
| 2017/0070914 | A1* | 3/2017 | Chun | ...................... H04W 4/70 |
| 2019/0140709 | A1* | 5/2019 | Guerra | ................. H04B 7/0452 |
| 2021/0281364 | A1* | 9/2021 | Yeh | ........................... H04L 1/20 |
| 2021/0385779 | A1* | 12/2021 | Oteri | ...................... H04B 7/024 |

FOREIGN PATENT DOCUMENTS

| | | |
|---|---|---|
| CN | 102970149 A | 3/2013 |
| CN | 105706377 A | 6/2016 |
| CN | 106102137 A | 11/2016 |
| CN | 106465271 A | 2/2017 |
| CN | 106658556 A | 5/2017 |
| WO | 2014068467 A2 | 5/2014 |

OTHER PUBLICATIONS

Mayank Agarwal: Intrusion Detection System for PS-Poll DoS Attack in 802.11 Networks Using Real Time Discrete Event System, IEEE/CAA Journal of Automatica Sinica, Oct. 15, 2017.

The first office action issued in corresponding CN application No. 202010822676.4 dated Apr. 13, 2022.

* cited by examiner

WIRELESS ACCESS
POINT (AP)

TERMINAL DEVICE
(STA)

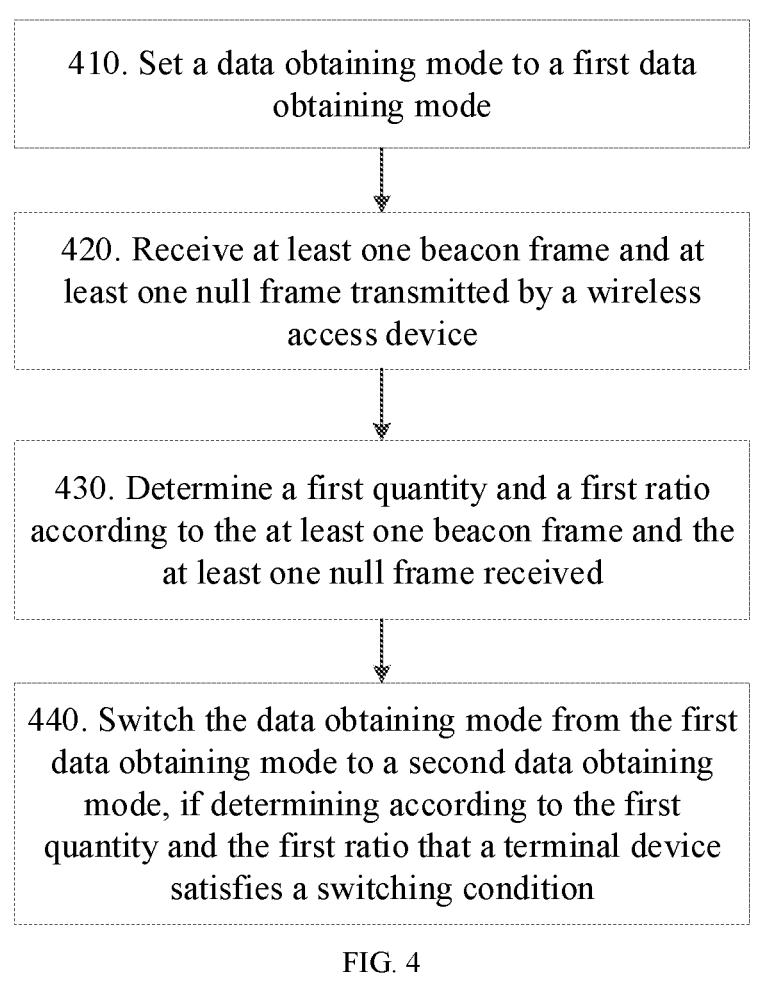

410. Set a data obtaining mode to a first data obtaining mode

420. Receive at least one beacon frame and at least one null frame transmitted by a wireless access device 430. Determine a first quantity and a first ratio according to the at least one beacon frame and the at least one null frame received 440. Switch the data obtaining mode from the first data obtaining mode to a second data obtaining mode, if determining according to the first quantity and the first ratio that a terminal device satisfies a switching condition

FIG. 4

METHOD FOR DATA OBTAINING AND COMMUNICATION DEVICE

CROSS-REFERENCE TO RELATED APPLICATION(S)

This application is a National Stage of International Application No. PCT/CN2021/106468, field Jul. 15, 2021, which claims priority to Chinese Patent Application No. 202010822676.4, filed Aug. 14, 2020, the entire disclosures of which are hereby incorporated by reference.

TECHNICAL FIELD

This application relates to the field of communication technology, and particularly to a method for data obtaining and a communication device.

BACKGROUND

After a wireless terminal (e.g., a station, "STA" for short) is connected to a wireless network through a wireless access point (AP), if no service is in operation at an STA side, the STA may enter a sleep state in order to reduce power consumption and save power. In this situation, if the AP has a buffer data frame to be transmitted to an STA terminal, the AP can notify the STA by periodically broadcasting a beacon frame, so that data transmission can be performed.

Currently, the STA can obtain a buffer data frame in the AP by transmitting a power save-poll (PS-Poll) frame or an active null frame to the AP. However, the PS-Poll frame may have a compatibility problem, thus the AP can't parse the PS-Poll frame transmitted by the STA, resulting in increased delay in data obtaining. On the other hand, the active null frame is more compatible, but has higher power consumption compared to the PS-Poll frame.

SUMMARY

In a first aspect, implementations of the disclosure provide a method for data obtaining. The method is performed by a terminal device. The method includes: setting a data obtaining mode to a first data obtaining mode; receiving at least one beacon frame and at least one null frame from a wireless access device; determining a first quantity and a first ratio according to the at least one beacon frame and the at least one null frame received; and switching the data obtaining mode from the first data obtaining mode to a second data obtaining mode, in response to determining according to the first quantity and the first ratio that a switching condition is satisfied.

In a second aspect, implementations of the disclosure provide a communication device. The communication device includes a transceiver, a processor, and a memory. The processor is coupled with the transceiver. The memory is coupled with the transceiver and the processor, and stores computer programs. The computer programs include program instructions which are operable to with the processor to: set a data obtaining mode to a first data obtaining mode; cause the transceiver to receive at least one beacon frame and at least one null frame from a wireless access device; determine a first quantity and a first ratio according to the at least one beacon frame and the at least one null frame received; and switch the data obtaining mode from the first data obtaining mode to a second data obtaining mode, in response to determining according to the first quantity and the first ratio that a switching condition is satisfied.

In a third aspect, implementations of the disclosure provide a non-transitory computer-readable storage medium. The non-transitory computer-readable storage medium stores one or more instructions which, when executed by a processor, cause the processor to carry out the method for data obtaining in the first aspect.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

FIG. 4 is a schematic flowchart illustrating a method for data obtaining provided in implementations of the disclosure.

DETAILED DESCRIPTION

Hereinafter, technical solutions of implementations of the disclosure will be depicted clearly and completely with reference to accompanying drawings in the implementations.

In order to better understand the implementations of the disclosure, the following will introduce technical terms involved in the implementations of the disclosure.

Wireless local area network (WLAN): WLAN refers to a network system in which computer devices interconnected using wireless communication technology can communicate with each other and realize resource sharing. The essential feature of WLAN is that a computer is connected to a network through wireless connection instead of using communication cables, so that construction of the network and movement of terminals are more flexible. WLAN adopts radio frequency (RF) technology and uses electromagnetic waves, can replace a local area network formed by old twisted-pair copper wires (coaxial), and can implement communication connections in the air, making data transmission more convenient.

Access point (AP): AP generally refers to a wireless access point, which can connect various wireless network clients together, and connect a wireless network to the Ethernet.

Beacon frame: beacon frame is a periodic frame that can provide guiding information. The beacon frame may contain traffic indication map (TIM), and the TIM is used to indicate terminals (e.g., a station, "STA" for short) in a power saving mode for which the AP has buffered data. After the STA receives the beacon frame, if the STA has its own management ID, the STA requests to extract data.

Power save-poll (PS-Poll) frame: when the STA wakes up from a power saving mode, the STA transmits a PS-Poll frame to the AP to obtain any data frame buffered by the AP.

In order to better understand implementations of the disclosure, network architecture of the implementations to which the disclosure can be applied will be depicted below.

Figures 1, 2A:
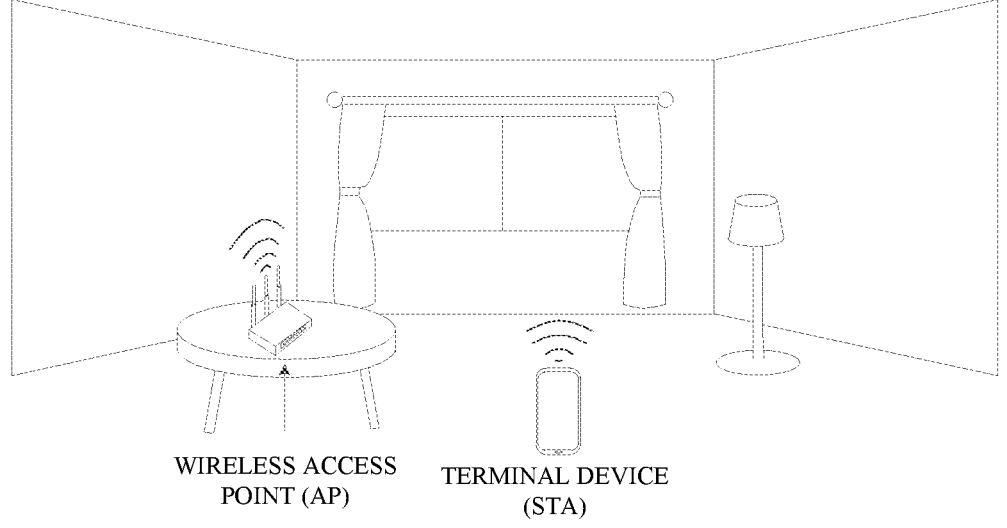
FIG. 1 is a network architecture diagram for wireless data transmission provided in implementations of the disclosure.
FIG. 2A is a schematic diagram illustrating a method in a power save-poll (PS-Poll) frame packet-obtaining mode provided in implementations of the disclosure.

Referring to FIG. 1, FIG. 1 is a network architecture diagram for wireless data transmission provided in implementations of the disclosure. As illustrated in FIG. 1, the network architecture relates to a wireless AP and a terminal device (e.g., an STA), where the AP may be a wireless access device. Wireless data communication can be performed between the wireless access device and the terminal device. After the STA is connected to a wireless network through the AP, if no service is in operation on the STA terminal (in the disclosure, "STA" and "STA terminal" can be used interchangeably), the STA will enter a sleep state to save power. In this situation, if the AP has a buffer data frame to be transmitted to the STA terminal, the AP will periodically broadcast a beacon frame containing first TIM information to notify the STA terminal to obtain the buffer data frame. It should be noted that, each beacon frame broadcasted by the AP contains TIM information, and the TIM information in the beacon frame is the first TIM information only when the AP has buffered data to be transmitted to the STA. The first TIM information may be valid TIM information, and indicates that the AP buffers a data frame(s) to-be-transmitted, while TIM information in the related art does not have such an indication function. Moreover, first TIM information in each TIM beacon frame is not necessarily the same. For convenience of description, beacon frames containing the first TIM information in implementations of the disclosure are collectively described as valid TIM beacon frames. For beacon frames that do not contain first TIM information, TIM information in these beacon frames has no significant relationship with the disclosure, and thus, no special description is given for these beacon frames. In addition, FIG. 1 illustrates a home scene, and in practice, the network architecture may be applied to a scene with a large coverage area such as a large shopping mall, a school, a company, etc., implementations of the disclosure merely take the home scene as an example, and the disclosure it not limited thereto.

The terminal device (e.g., an STA) in implementations of the disclosure is an entity at a client side for receiving or transmitting a signal. The terminal device may be a device that provides voice and/or data connectivity for a client, for example, a handheld device with a wireless connection function, an on-board device, etc. The terminal device may also be other processing devices connected with a wireless modem. The terminal device can communicate with a radio access network (RAN). The terminal device can also be referred to as a wireless terminal, a subscriber unit, a subscriber station, a mobile station, a mobile, a remote station, an AP, a remote terminal, an access terminal, a user terminal, a user agent, a user device, or user equipment (UE), etc. The terminal device may be a mobile terminal, such as a mobile (or cellular) phone and a computer with a mobile terminal, such as portable, pocket, hand-held, computer-built-in, or vehicle-mounted mobile devices, which communicate with a wireless access network to exchange language and/or data. For instance, the terminal device can also be a personal communication service (PCS) phone, a cordless phone, a session initiation protocol (SIP) phone, a wireless local loop (WLL) station, a personal digital assistant (PDA), and other devices. Common terminal devices, for example, include mobile phones, tablet computers, notebook computers, handheld computers, mobile Internet devices (MID), vehicles, roadside equipment, aircraft, and wearable devices (e.g., smart watches, smart bracelets, pedometers, etc.), which are not limited in implementations of the disclosure.

In the related art, the STA terminal obtains the buffer data frame from the AP in the following two ways.

The first way: for some WLAN terminals, the STA terminal obtains a buffer data frame from the AP by transmitting a PS-Poll frame to the AP. For example, as illustrated in FIG. 2A, the AP broadcasts periodically three beacon frames (i.e., beacon frame 1, beacon frame 2, and beacon frame 3) within a time period, where beacon frame 2 and beacon frame 3 each are a valid TIM beacon frame, and beacon frame 1 does not contain first TIM information. The STA periodically wakes up to receive beacon frame 2, once first TIM information in beacon frame 2 is read out, the STA may transmit a PS-Poll frame to the AP to obtain a buffer data frame from the AP. The STA periodically wakes up to receive beacon frame 3, once first TIM information in beacon frame 3 is read out, the STA may transmit PS-Poll frame 1 to the AP to obtain buffer data frame 1, and transmit PS-Poll frame 2 to the AP to obtain buffer data frame 2. It should be noted that, the AP periodically broadcasts a beacon frame, and the STA periodically wakes up to receive a beacon frame, so as to achieve period synchronization. The AP and the STA may configure their respective periods to be the same in advance, to reduce unnecessary resource waste. In addition, every time the STA obtains a buffer data frame, the STA can obtain a more data bit (MDB) corresponding to the buffer data frame. If the MDB is 1, it means that data in buffer data frame 1 transmitted by the AP is only part of data buffered by the AP, and buffer data frame 1 is followed by another buffer data frame. In this situation, after receiving buffer data frame 1, the STA transmits PS-Poll frame 2 to the AP to obtain remaining buffered data. When the STA receives buffer data frame 2 and reads that an MDB in buffer data frame 2 is 0, it means that all data buffered by the AP has been obtained, and there is no need to transmit a PS-Poll frame in a current period. The STA periodically wakes up to receive a beacon frame, and returns to a sleep state after finishing works in this period.

Figure 2B:
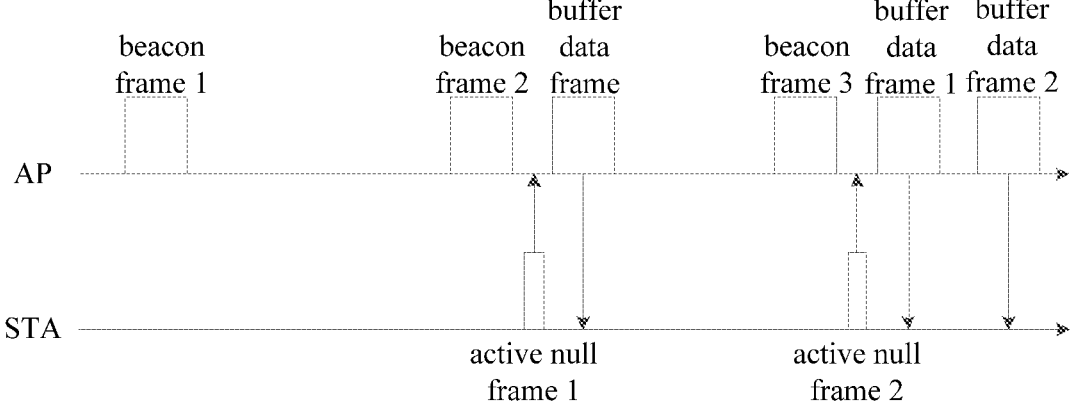
FIG. 2B is a schematic diagram illustrating a method in an active null frame packet-obtaining mode provided in implementations of the disclosure.

The second way: the STA obtains data from the AP by transmitting an active null frame to the AP. As illustrated in FIG. 2B, the AP broadcasts periodically three beacon frames (i.e., beacon frame 1, beacon frame 2, and beacon frame 3) within a time period, where beacon frame 2 and beacon frame 3 each are a valid TIM beacon frame, and beacon frame 1 does not contain first TIM information. The STA periodically wakes up to receive beacon frame 2, once first TIM information in beacon frame 2 is read out, the STA may transmit active null frame 1 to the AP, where active null frame 1 can inform the AP that the STA is in a working state, so that the AP transmits buffered data to the STA. As illustrated in FIG. 2B, when receiving beacon frame 3, the STA performs the same processing as when receiving beacon frame 2, and if data buffered by the AP is relatively large in a current period, the AP will transmit a buffer data frame to the STA multiple times, and does not need to receive an active null frame transmitted by the STA again.

Figure 3:
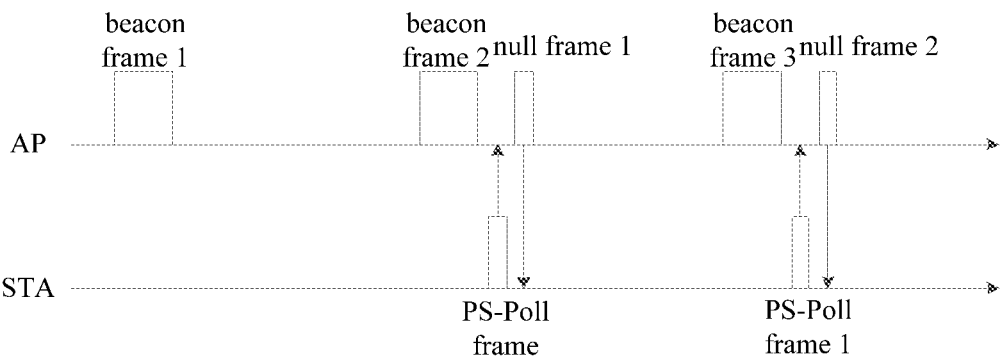
FIG. 3 is a schematic diagram illustrating another method in the PS-Poll frame packet-obtaining mode provided in implementations of the disclosure.

For the first way of data obtaining, the STA is in a sleep state originally, and wakes up for short to receive a beacon frame. Since the amount of data buffered for the sleep state by the network is generally not large, all buffered data can basically be obtained from the AP through several PS-Poll interactions, so that the STA can quickly enter the sleep state, and thus, power consumption in the first way is extremely low. However, the PS-Poll frame may have a compatibility problem, that is, the PS-Poll frame transmitted by the STA may not be correctly parsed by the AP, which will cause that the AP can't transmit the buffered data to the STA, but transmits a null frame, as illustrated in FIG. 3. An MDB in the null frame being 0 means that there is no subsequent data frame, only the current null frame exits. As such, the STA will not be able to effectively obtain data, resulting in problems such as data access delay on the network, unsmooth network access, and higher system power consumption, and further seriously affecting user experience. For the second way of data obtaining, the active null frame can effectively avoid the compatibility problem, so that the STA can obtain a packet more easily. However, when obtaining data through the active null frame, the STA needs to switch from the sleep state to an active state upon reception of a valid TIM beacon frame, and needs to further monitor beacon frames in several consecutive periods. When determining that no service will arrive, the STA switches back to the sleep state from the active state, and thus, the second way has much more power consumption than the first way.

In order to obtain data with low delay and low power consumption, implementations of the disclosure provide a method for data obtaining and a communication device. The method for data obtaining and the communication device of implementations of the disclosure will be further depicted in detail below.

Referring to FIG. 4, FIG. 4 is a schematic flowchart illustrating a method for data obtaining provided in implementations of the disclosure. These implementations may be applied to a terminal device (e.g., an STA), and specifically to a media access control (MAC) layer in the STA. When the MAC layer in the STA executes the flows illustrated in FIG. 4, the method for data obtaining includes the following.

At 410, set a data obtaining mode to a first data obtaining mode.

The STA sets the data obtaining mode to the first data obtaining mode by default. The first data obtaining mode may be a PS-Poll packet-obtaining mode, that is, buffered data is obtained from the AP through a PS-Poll frame. In the case of no compatibility problem, adopting a PS-Poll frame-based method can greatly reduce power consumption of the STA, and therefore, such mode should be the first choice.

At 420, receive at least one beacon frame and at least one null frame transmitted by a wireless access device.

Specifically, the STA receives at least one beacon frame and at least one null frame according to the method illustrated in FIG. 2A or FIG. 3. Within a time period, the STA first receives at least one beacon frame transmitted by a wireless AP, where the at least one beacon frame is transmitted periodically. When a beacon frame received by the STA contains first TIM information, the STA may transmit at least one PS-Poll frame to the AP. If the AP can parse the PS-Poll frame transmitted by the STA, the AP transmits at least one buffer data frame to the STA. Conversely, if the AP cannot parse the PS-Poll frame transmitted by the STA, the AP transmits a null frame to the STA. It can be understood that, when the STA receives a valid TIM beacon frame, if the AP can parse the PS-Poll frame transmitted by the STA, the STA needs to transmit at least one PS-Poll frame to the AP to receive at least one buffer data frame or a null frame transmitted by the AP.

At 430, determine a first quantity and a first ratio according to the at least one beacon frame and the at least one null frame received.

The STA can determine the first quantity according to at least one null frame received within a time period, where the first quantity may be the number of occurrences of abnormal packet-obtaining scenes, that is, Abnormal_Scene_Count. The abnormal packet-obtaining scene is that: in a beacon period, a beacon frame received by the STA is a valid TIM beacon frame, and the STA only receives a null frame transmitted by the AP after the STA transmits a PS-Poll frame to the AP, where an MDB of the null frame is 0. Specifically, when the STA receives a null frame in which an MDB is 0, a first counter is incremented by 1, where the first counter is used to record the number of occurrences of abnormal packet-obtaining scenes. The STA determines Abnormal_Scene_Count according to a value recorded in the first counter. Before determining the first ratio, the STA also needs to determine a second quantity according to the at least one beacon frame, where the second quantity is a quantity of valid TIM beacon frames in the at least one beacon frame, that is, TIM_Beacon_Count. After the STA receives a beacon frame containing the first TIM information, a second counter is incremented by 1, where the second counter is used to record the quantity of valid TIM beacon frames. After determining Abnormal_Scene_Count and TIM_Beacon_Count, the STA can determine the first ratio, where the first ratio may be a ratio of the first quantity to the second quantity, which is recorded as Ratio, that is, Ratio=Abnormal_Scene_Count/TIM_Beacon_Count.

Figure 5:
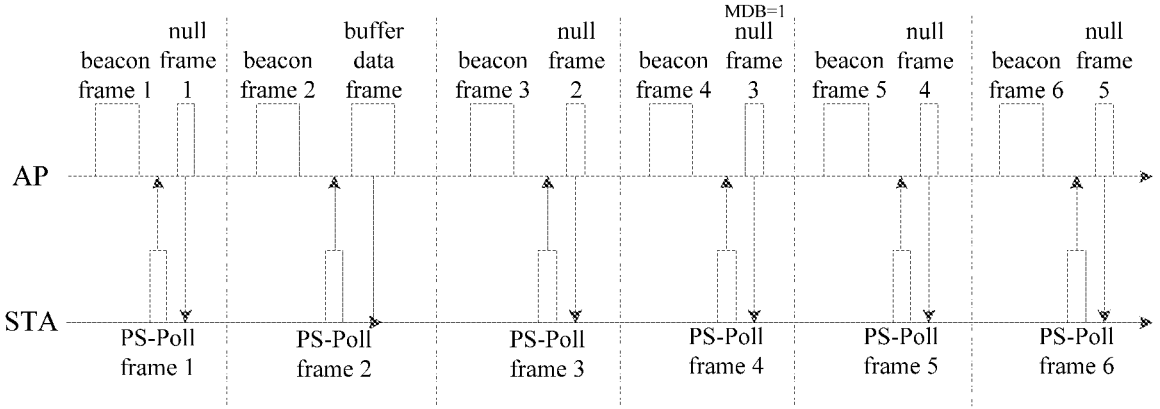
FIG. 5 is a schematic diagram illustrating another method in the PS-Poll frame packet-obtaining mode provided in implementations of the disclosure.

For example, as illustrated in FIG. 5, the STA receives beacon frame 1 to beacon frame 6 within a time period of five minutes, where beacon frame 1 to beacon frame 6 each are a valid TIM beacon frame. For null frame 1 to null frame 5 received by the STA, an MDB in null frame 3 is 1, and MDBs in null frames other than null frame 3 each are 0. The STA can determine that the first quantity (i.e., Abnormal_Scene_Count) is 4, the second quantity (i.e., TIM_Beacon_Count) is 6, and the first ratio (i.e., Ratio) is 2/3.

At 440, if determining according to the first quantity and the first ratio that the terminal device satisfies a switching condition, switch the data obtaining mode from the first data obtaining mode to a second data obtaining mode.

Specifically, if the first quantity (i.e., Abnormal_Scene_Count) is greater than a quantity threshold (i.e., Threshold_Count) and Ratio is greater than or equal to a ratio threshold (i.e., Threshold_Ratio), the STA determines that a compatibility problem of the PS-Poll frame exists and the switching condition is satisfied. Threshold_Count and Threshold_Ratio may be configured by the STA, which are not limited in implementations of the disclosure. Once the switching condition is satisfied, the STA switches the data obtaining mode from the first data obtaining mode to the second data obtaining mode. The second data obtaining mode may be that data is obtained from the AP through an active null frame. For example, as illustrated in FIG. 5, Abnormal_Scene_Count is 4 and the first ratio (i.e., Ratio)

is 2/3, if Threshold_Count is 3 and Threshold_Ratio is 50%, Abnormal_Scene_Count is greater than Threshold_Count and Ratio is greater than Threshold_Ratio, it means that the STA satisfies the switching condition, and the STA needs to enable the second data obtaining mode. After enabling the second data obtaining mode, the STA can transmit an active null frame to the AP, and receive a buffer data frame transmitted by the AP. The STA switches the data obtaining mode from the first data obtaining mode to the second data obtaining mode, and through calculation of the MAC layer, an appropriate time for switching can be determined and selected, for instance, switching within a time period after the STA receives a null frame and before the STA receives a next beacon frame, etc., which is not limited in implementations of the disclosure.

It should be noted that, the AP may occasionally respond to PS-Poll of the STA with a null frame containing an MDB of 0 after the STA receives a valid TIM beacon, such case, however, is not enough to determine that a compatibility problem of the PS-Poll frame exists. This is because during buffering of data packets, the AP may not receive the PS-Poll transmitted by the STA for multiple times due to influence of the network environment, or because an air interface propagation medium is in a busy state for a long time, so that buffered data packets cannot be transmitted, which results in that buffered data packets are cleaned up at an AP side after the buffered data packets expires. Therefore, it is normal that the AP occasionally responds to PS-Poll of the STA with a null frame containing an MDB of 0, and accordingly, it cannot be considered that there is the compatibility problem of the PS-Poll frame.

In a possible implementation, after the STA switches the data obtaining mode from the first data obtaining mode to the second data obtaining mode, if the STA finishes receiving of data buffered in the AP and confirms that there is no further service, the STA switches back to the sleep state from the active state. The STA may maintain the second data obtaining mode in the following data obtaining process. It is not ruled out that the compatibility problem of the PS-Poll frame is solved in the future, in this situation, the STA can determine whether it is necessary to switch the data obtaining mode from the second data obtaining mode to the first data obtaining mode according to specific scenes, and performs switching when necessary.

According to implementations of the disclosure, in a time period, if the number of occurrences of abnormal packet-obtaining scenes is greater than the quantity threshold and a ratio of the number of occurrences of abnormal packet-obtaining scenes to the quantity of valid TIM beacon frames reaches the ratio threshold, the STA can switch the data obtaining mode from the first data obtaining mode to the second data obtaining mode. Firmware software of the MAC layer in the STA will continuously monitor existence of abnormalities, and fully count valid TIM beacon frames and null frames received. Instead of performing switching of the data obtaining mode once an abnormal packet-obtaining scene is detected, the switching is triggered only when the above condition is satisfied, so that the network system is more robust. This method combines the PS-Poll packet-obtaining mode with the active null packet-obtaining mode, which not only retains characteristics of low power consumption of PS-Poll, but also inherits characteristics of high compatibility and low delay of active null, so that the STA can obtain buffered data from the AP with low power consumption and low delay, and has better universality and comprehensiveness.

Figure 6:
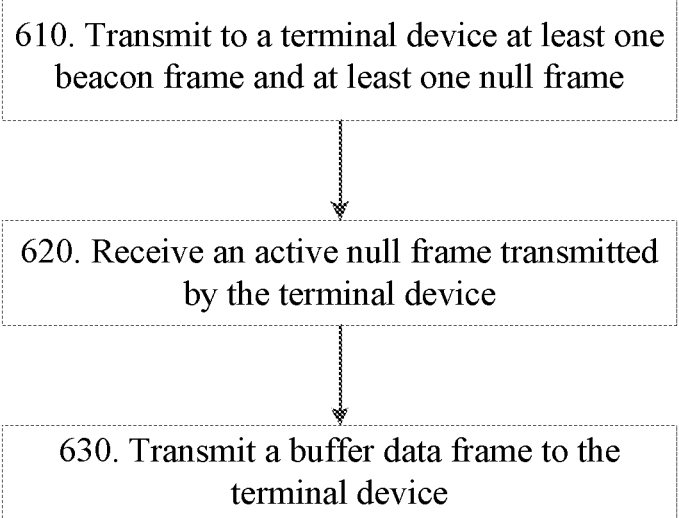
FIG. 6 is a schematic flowchart illustrating another method for data obtaining provided in implementations of the disclosure.

Referring to FIG. 6, FIG. 6 is a schematic flowchart illustrating another method for data obtaining provided in implementations of the disclosure. These flows can be applied to a wireless access device. When the wireless access device executes the flows of the method for data obtaining illustrated in FIG. 6, the method for data obtaining includes the following.

At 610, transmit to a terminal device at least one beacon frame and at least one null frame.

The AP can periodically broadcast beacon frames to the STA. When the AP has a buffer data frame to be transmitted to the STA, a beacon frame transmitted by the AP will carry first TIM information, that is, transmitting a valid TIM beacon frame. The valid TIM beacon frame can inform the STA that the AP has buffered data to-be-transmitted, which needs to be acquired by the STA. When the AP receives a PS-Poll frame transmitted by the STA, the AP parses the PS-Poll frame. If the parsing fails, the AP transmits a null frame to the STA, where an MDB in the null frame is 0, which means that no other data frames will be transmitted to the STA next. That is to say, in a beacon period, the AP transmits at most one valid TIM beacon frame and one null frame to the STA. After several periods of transmitting, the AP transmits at least one beacon frame and at least one null frame to the STA, which may trigger the STA to detect that a compatibility problem of the PS-Poll frame exists.

At 620, receive an active null frame transmitted by the terminal device.

The AP receives the active null frame, it means that the compatibility problem of the PS-Poll frame has been detected at an STA side, and switches the data obtaining mode to the active null packet-obtaining mode.

At 630, transmit a buffer data frame to the terminal device.

The AP can transmit buffered data to the STA according to the active null, and does not need to receive other interaction information transmitted by the STA.

According to implementations of the disclosure, the AP can transmit at least one null frame to the STA when the PS-Poll frame transmitted by the STA cannot be parsed, so that the STA can identify and count abnormal packet-obtaining scenes. When the switching condition is satisfied, the AP can transmit buffered data to the STA in response to receiving the active null frame transmitted by the STA. As such, delay of data transmission in the disclosure can be greatly reduced compared to the traditional PS-Poll packet-obtaining mode, while ensuring that power consumption of the network system is not too large, thereby achieving better comprehensiveness.

Figure 7:
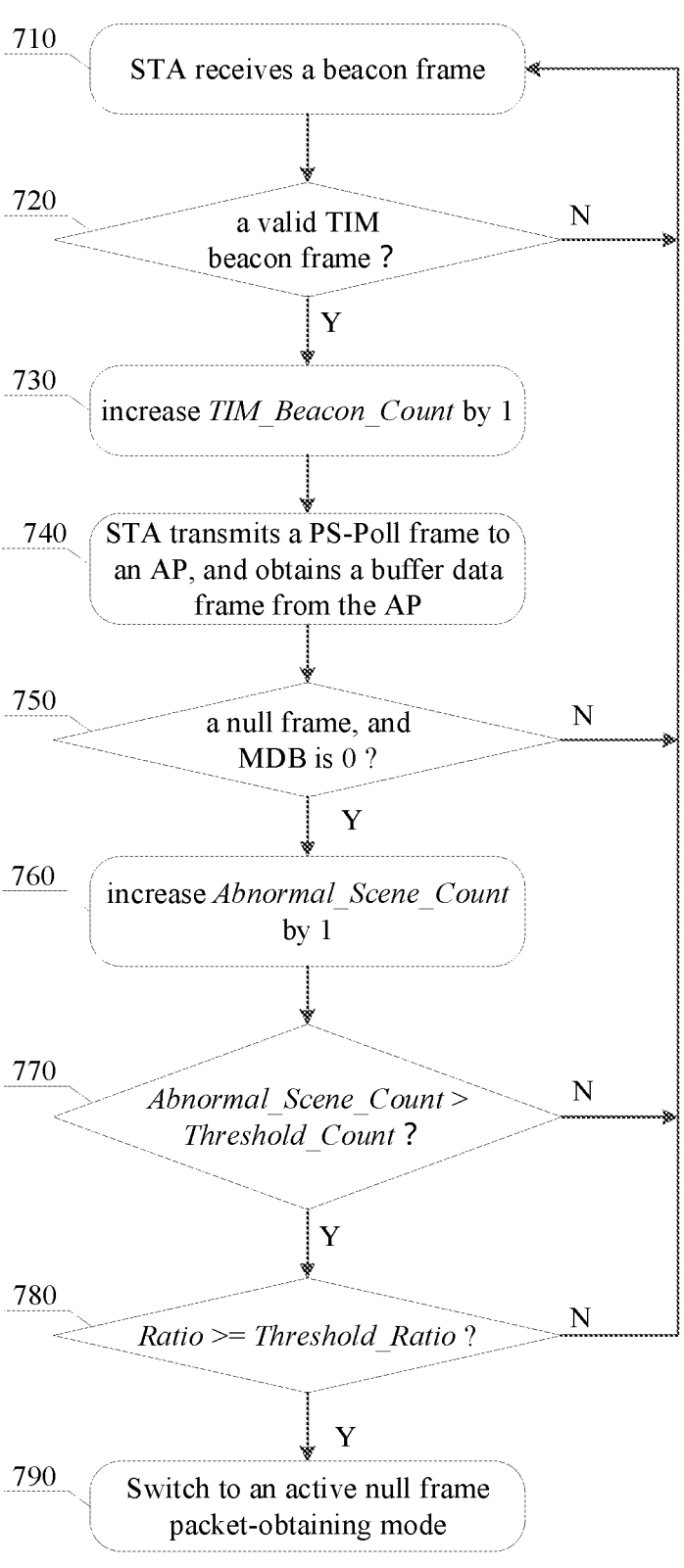
FIG. 7 is a schematic diagram illustrating a judgment flow of data-obtaining-mode switching provided in implementations of the disclosure.

Referring to FIG. 7, FIG. 7 is a schematic diagram illustrating a judgment flow of data-obtaining-mode switching provided in implementations of the disclosure. These implementations are applied to a terminal device, the specific flow is completed by an MAC layer in the terminal device, and the judgment flow includes the following.

At 710, receive a beacon frame transmitted by an AP.

At 720, determine whether the beacon frame is a valid TIM beacon frame, and execute an operation at 730 if the beacon frame is a valid TIM beacon frame, or execute an operation at 710 if the beacon frame is not a valid TIM beacon frame.

At 730, increase TIM_Beacon_Count by 1.

At 740, transmit a PS-Poll frame to the AP, and obtain a buffer data frame from the AP.

At 750, determine whether the received data frame is a null frame and an MDB of the null frame is 0, and execute an operation at 760 if the received data frame is a null frame, or execute an operation at 710 if the received data frame is not a null frame.

At 760, increase Abnormal_Scene_Count by 1.

At 770, determine whether Abnormal_Scene_Count is greater than Threshold_Count, and execute an operation at 780 if Abnormal_Scene_Count is greater than Threshold_Count, or execute an operation at 710 if Abnormal_Scene_Count is less than or equal to Threshold_Count.

At 780, determine whether Ratio=(Abnormal_Scene_Count/TIM_Beacon_Count) is greater than or equal to Threshold_Ratio, and execute an operation at 790 if Ratio is greater than or equal to Threshold_Ratio, or execute an operation at 710 if Ratio is less than Threshold_Ratio.

At 790, switch a data obtaining mode from a first data obtaining mode to a second data obtaining mode.

According to implementations of the disclosure, the MAC layer in the STA can quickly detect that delay and lag in network access exists. Compared to feeding back a network problem to a lower layer from an upper layer, a detection speed of the abnormal scene is faster. The MAC layer can implement fast detection, so that the STA can quickly complete detection of the abnormal packet-obtaining scene. When a certain condition is satisfied, it is determined that a compatibility problem of PS-Poll exists, so as to quickly switch to the active null packet-obtaining mode to reduce transmission delay of network data.

Figure 8:
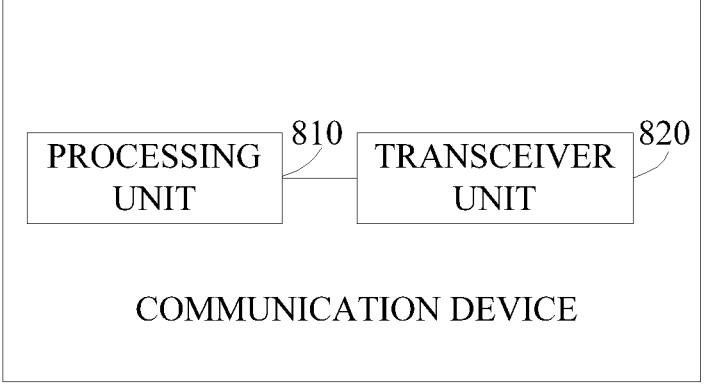
FIG. 8 is a block diagram illustrating a communication device provided in implementations of the disclosure.

Referring to FIG. 8, FIG. 8 is a block diagram illustrating a communication device provided in implementations of the disclosure. The communication device illustrated in FIG. 8 may be used to perform all or some of functions of the terminal device in the foregoing method implementations described with reference to FIG. 4, FIG. 6, and FIG. 7. The communication device may be a terminal device, or an apparatus of the terminal device, or a device that can be matched with the terminal device. A logical structure of the communication device may include a processing unit 810 and a transceiver unit 820. When the communication device is applied to the terminal device, the processing unit 810 is configured to set a data obtaining mode to a first data obtaining mode; the transceiver unit 820 is configured to receive at least one beacon frame and at least one null frame from a wireless access device; the processing unit 810 is further configured to determine a first quantity and a first ratio according to the at least one beacon frame and the at least one null frame received; and the processing unit 810 is further configured to switch the data obtaining mode from the first data obtaining mode to a second data obtaining mode, in response to determining that a terminal device satisfies a switching condition according to the first quantity and the first ratio.

In a possible implementation, the processing unit 810 is further configured to receive the at least one beacon frame from the wireless access device; transmit at least one PS-Poll frame to the wireless access device; and receive the at least one null frame from the wireless access device.

In a possible implementation, the processing unit 810 is further configured to determine the first quantity according to the at least one null frame; obtain a second quantity according to the at least one beacon frame; and determine the first ratio according to the first quantity and the second quantity, where the first ratio is a ratio of the first quantity to the second quantity.

In a possible implementation, the processing unit 810 is further configured to increment a first counter by 1 in response to an MDB in a null frame in the at least one null frame being 0, where the first counter is used to count abnormal packet-obtaining scenes; and determine the first quantity according to the first counter.

In a possible implementation, the processing unit 810 is further configured to increment a second counter by 1 in response to a beacon frame in the at least one beacon frame containing first TIM information, where the second counter is used to count beacon frames containing the first TIM information; and determine the second quantity according to the second counter.

In a possible implementation, the processing unit 810 is further configured to determine that the terminal device satisfies the switching condition, in response to the first quantity being greater than a quantity threshold and the first ratio being greater than or equal to a ratio threshold; and switch the data obtaining mode from the first data obtaining mode to the second data obtaining mode.

In a possible implementation, after switching by the processing unit 810 the data obtaining mode from the first data obtaining mode to the second data obtaining mode, the transceiver unit 820 is further configured to transmit an active null frame to the wireless access device; and receive a buffer data frame from the wireless access device.

According to implementations of the disclosure, in a time period, if the number of occurrences of abnormal packet-obtaining scenes is greater than the quantity threshold and a ratio of the number of occurrences of abnormal packet-obtaining scenes to the quantity of valid TIM beacon frames reaches the ratio threshold, the STA can switch the data obtaining mode from the first data obtaining mode to the second data obtaining mode. Firmware software of the MAC layer in the STA will continuously monitor existence of abnormalities, and fully count valid TIM beacon frames and null frames received. Instead of performing switching of the data obtaining mode once an abnormal packet-obtaining scene is detected, the switching is triggered only when the above condition is satisfied, so that the network system is more robust. This method combines the PS-Poll packet-obtaining mode with the active null packet-obtaining mode, which not only retains characteristics of low power consumption of PS-Poll, but also inherits characteristics of high compatibility and low delay of active null, so that the STA can obtain buffered data from the AP with low power consumption and low delay, and has better universality and comprehensiveness.

Figure 9:
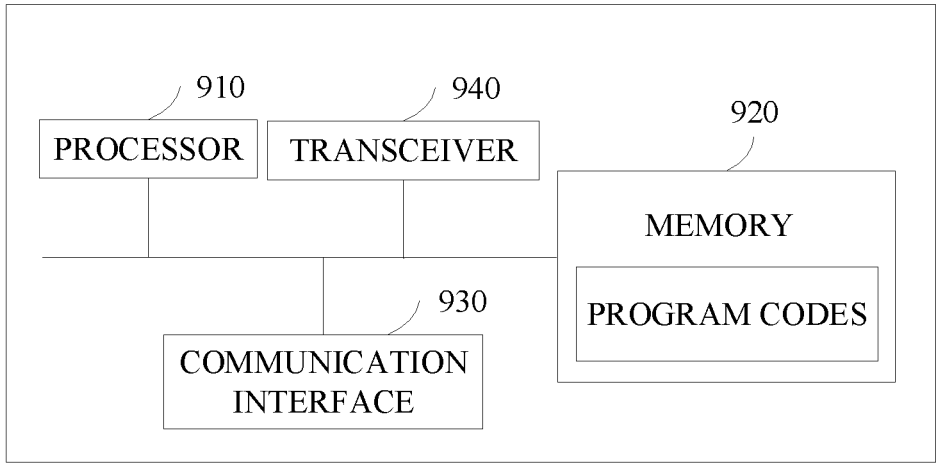
FIG. 9 is a simplified schematic diagram illustrating a physical structure of a communication device provided in implementations of the disclosure.

Referring to FIG. 9, FIG. 9 is a simplified schematic diagram illustrating a physical structure of a communication device provided in implementations of the disclosure. The communication device includes a processor 910, a memory 920, a communication interface 930, and a transceiver 940. The processor 910, the memory 920, the communication interface 930, and the transceiver 940 are coupled to each other through one or more communication buses.

The processor 910 is configured to support the communication device to execute functions corresponding to the method in FIG. 4, FIG. 6, and FIG. 7. The processor 910 may be a central processing unit (CPU), a network processor (NP), a hardware chip, or any combination thereof.

The memory 920 is used to store program codes, etc. The memory 920 may include a transitory memory, such as a random access memory (RAM). The memory 920 may also include a non-transitory memory, such as a read-only memory (ROM), a flash memory, a hard disk drive (HDD) or a solid-state drive (SSD). The memory 920 may also include a combination of the above memories.

The communication interface 930 is configured to transmit and receive data, information, or messages, etc., and may also be described as a transceiver, a transceiver circuit, and the like. As an example, the communication interface 930 is configured to receive at least one beacon frame and at least one null frame transmitted by a wireless access device, or transmit an active null frame to the wireless access device.

In implementations of the disclosure, when the communication device is applied to a terminal device, the program codes stored in the memory 920, when called by the processor 910, are operable to execute the following operations. The program codes stored in the memory 920, when called by the processor 910, are operable to: set a data obtaining mode to a first data obtaining mode; control the communication interface 930 to receive at least one beacon frame and at least one null frame from a wireless access device; determine a first quantity and a first ratio according to the at least one beacon frame and the at least one null frame received; and switch the data obtaining mode from the first data obtaining mode to a second data obtaining mode, in response to determining that a terminal device satisfies a switching condition according to the first quantity and the first ratio.

In a possible implementation, the program codes stored in the memory 920, when called by the processor 910, are operable to: receive the at least one beacon frame from the wireless access device; transmit at least one PS-Poll frame to the wireless access device; and receive the at least one null frame from the wireless access device.

In a possible implementation, the program codes stored in the memory 920, when called by the processor 910, are operable to: determine the first quantity according to the at least one null frame; obtain a second quantity according to the at least one beacon frame; and determine the first ratio according to the first quantity and the second quantity, where the first ratio is a ratio of the first quantity to the second quantity.

In a possible implementation, the program codes stored in the memory 920, when called by the processor 910, are operable to: increment a first counter by 1 in response to an MDB in a null frame in the at least one null frame being 0, where the first counter is used to count abnormal packet-obtaining scenes; and determine the first quantity according to the first counter.

In a possible implementation, the program codes stored in the memory 920, when called by the processor 910, are operable to: increment a second counter by 1 in response to a beacon frame in the at least one beacon frame containing first TIM information, where the second counter is used to count beacon frames containing the first TIM information; and determine the second quantity according to the second counter.

In a possible implementation, the program codes stored in the memory 920, when called by the processor 910, are operable to: determine that the terminal device satisfies the switching condition, in response to the first quantity being greater than a quantity threshold and the first ratio being greater than or equal to a ratio threshold; and switch the data obtaining mode from the first data obtaining mode to the second data obtaining mode.

In a possible implementation, the program codes stored in the memory 920, when called by the processor 910, are operable to: after switching the data obtaining mode from the first data obtaining mode to the second data obtaining mode, control the communication interface 930 to transmit an active null frame to the wireless access device; and receive a buffer data frame from the wireless access device.

According to implementations of the disclosure, in a time period, if the number of occurrences of abnormal packet-obtaining scenes is greater than the quantity threshold and a ratio of the number of occurrences of abnormal packet-obtaining scenes to the quantity of valid TIM beacon frames reaches the ratio threshold, the STA can switch the data obtaining mode from the first data obtaining mode to the second data obtaining mode. Firmware software of the MAC layer in the STA will continuously monitor existence of abnormalities, and fully count valid TIM beacon frames and null frames received. Instead of performing switching of the data obtaining mode once an abnormal packet-obtaining scene is detected, the switching is triggered only when the above condition is satisfied, so that the network system is more robust. This method combines the PS-Poll packet-obtaining mode with the active null packet-obtaining mode, which not only retains characteristics of low power consumption of PS-Poll, but also inherits characteristics of high compatibility and low delay of active null, so that the STA can obtain buffered data from the AP with low power consumption and low delay, and has better universality and comprehensiveness.

It should be noted that, in the foregoing implementations, the description of each implementation has its own emphasis. For the parts not described in detail in one implementation, reference may be made to related descriptions in other implementations.

An execution sequence of the operations of the method in implementations of the disclosure may be adjusted, combined, and deleted according to actual needs.

Units of a processing device in implementations of the disclosure may be combined, divided, and deleted according to actual needs.

All or part of the foregoing implementations may be implemented by software, hardware, firmware, or any combination thereof. When implemented by software, it may be implemented in whole or in part in a form of a computer program product. The computer program product includes one or more computer instructions. The computer program instructions, when loaded and executed by a computer, are operable to implement a process or functions of implementations of the disclosure in whole or in part. The computer may be a general-purpose computer, a special-purpose computer, a computer network, or other programmable device. The computer instructions may be stored in or transmitted from a computer-readable storage medium to another computer-readable storage medium, for instance, the computer instructions can be transmitted in a wired (e.g., coaxial cable, optical fiber, digital subscriber line) or wireless (e.g., infrared, wireless, microwave) way from a website site, computer, server, or data center to another website site, computer, server, or data center. The computer-readable storage medium may be any available medium that can be accessed by a computer, or a data storage device containing a server, a data center, etc. which is integrated with one or more available media. The available media may be magnetic media (e.g., a floppy disk, a memory disk, magnetic tape), optical media (e.g., DVD), or semiconductor media (e.g., SSD), etc.

The disclosure provides a method for data obtaining and a communication device, which can obtain data with low delay and low power consumption.

In a first aspect, implementations of the disclosure provide a method for data obtaining. The method is performed by a terminal device. The method includes: setting a data obtaining mode to a first data obtaining mode; receiving at least one beacon frame and at least one null frame from a wireless access device; determining a first quantity and a first ratio according to the at least one beacon frame and the at least one null frame received; and switching the data obtaining mode from the first data obtaining mode to a second data obtaining mode, in response to determining according to the first quantity and the first ratio that a switching condition is satisfied.

In an implementation, receiving the at least one beacon frame and the at least one null frame from the wireless access device includes: receiving the at least one beacon frame from the wireless access device; transmitting at least one PS-Poll frame to the wireless access device; and receiving the at least one null frame from the wireless access device.

In an implementation, determining the first quantity and the first ratio according to the at least one beacon frame and the at least one null frame received includes: determining the first quantity according to the at least one null frame; obtaining a second quantity according to the at least one beacon frame; and determining the first ratio according to the first quantity and the second quantity, where the first ratio is a ratio of the first quantity to the second quantity.

In an implementation, determining the first quantity according to the at least one null frame includes: incrementing a first counter by 1 in response to an MDB in a null frame in the at least one null frame being 0, where the first counter is used to count abnormal packet-obtaining scenes; and determining the first quantity according to the first counter.

In an implementation, obtaining the second quantity according to the at least one beacon frame includes: incrementing a second counter by 1 in response to a beacon frame in the at least one beacon frame containing first TIM information, where the second counter is used to count beacon frames containing the first TIM information; and determining the second quantity according to the second counter.

In an implementation, switching the data obtaining mode from the first data obtaining mode to the second data obtaining mode in response to determining according to the first quantity and the first ratio that the switching condition is satisfied includes: determining that the switching condition is satisfied, in response to the first quantity being greater than a quantity threshold and the first ratio being greater than or equal to a ratio threshold; and switching the data obtaining mode from the first data obtaining mode to the second data obtaining mode.

In an implementation, after switching the data obtaining mode from the first data obtaining mode to the second data obtaining mode, the method further includes: transmitting an active null frame to the wireless access device; and receiving a buffer data frame from the wireless access device.

In a second aspect, implementations of the disclosure provide a communication device. The communication device includes a processing unit and a transceiver unit. The processing unit is configured to set a data obtaining mode to a first data obtaining mode. The transceiver unit is configured to receive at least one beacon frame and at least one null frame from a wireless access device. The processing unit is further configured to determine a first quantity and a first ratio according to the at least one beacon frame and the at least one null frame received. The processing unit is further configured to switch the data obtaining mode from the first data obtaining mode to a second data obtaining mode, in response to determining that the communication device satisfies a switching condition according to the first quantity and the first ratio.

In a third aspect, implementations of the disclosure provide a communication device. The communication device includes a transceiver, a processor, and a memory. The processor is coupled with the transceiver. The memory is coupled with the transceiver and the processor, and stores computer programs. The computer programs include program instructions which are operable to with the processor to: set a data obtaining mode to a first data obtaining mode; cause the transceiver to receive at least one beacon frame and at least one null frame from a wireless access device; determine a first quantity and a first ratio according to the at least one beacon frame and the at least one null frame received; and switch the data obtaining mode from the first data obtaining mode to a second data obtaining mode, in response to determining according to the first quantity and the first ratio that a switching condition is satisfied.

In an implementation, the transceiver configured to receive the at least one beacon frame and the at least one null frame from the wireless access device is configured to: receive the at least one beacon frame from the wireless access device; transmit at least one PS-Poll frame to the wireless access device; and receive the at least one null frame from the wireless access device.

In an implementation, the processor configured to determine the first quantity and the first ratio according to the at least one beacon frame and the at least one null frame received is configured to: determine the first quantity according to the at least one null frame; obtain a second quantity according to the at least one beacon frame; and determine the first ratio according to the first quantity and the second quantity, wherein the first ratio is a ratio of the first quantity to the second quantity.

In an implementation, the processor configured to determine the first quantity according to the at least one null frame is configured to: increment a first counter by 1 in response to an MDB in a null frame in the at least one null frame being 0, wherein the first counter is used to count abnormal packet-obtaining scenes; and determine the first quantity according to the first counter.

In an implementation, the processor configured to obtain the second quantity according to the at least one beacon frame is configured to: increment a second counter by 1 in response to a beacon frame in the at least one beacon frame containing first TIM information, wherein the second counter is used to count beacon frames containing the first TIM information; and determine the second quantity according to the second counter.

In an implementation, the processor configured to switch the data obtaining mode from the first data obtaining mode to the second data obtaining mode in response to determining according to the first quantity and the first ratio that the switching condition is satisfied is configured to: determine that the switching condition is satisfied, in response to the first quantity being greater than a quantity threshold and the first ratio being greater than or equal to a ratio threshold; and switch the data obtaining mode from the first data obtaining mode to the second data obtaining mode.

In an implementation, the transceiver is further configured to: transmit an active null frame to the wireless access device and receive a buffer data frame from the wireless access device, after the data obtaining mode is switched from the first data obtaining mode to the second data obtaining mode.

In a fourth aspect, implementations of the disclosure provide a non-transitory computer-readable storage medium. The non-transitory computer-readable storage medium stores one or more instructions which, when executed by a processor, cause the processor to carry out the method for data obtaining in the first aspect.

In implementations of the disclosure, the terminal device can set the data obtaining mode to the first data obtaining mode, receive the at least one beacon frame and the at least one null frame from the wireless access device, determine the first quantity and the first ratio according to the at least one beacon frame and the at least one null frame received, and switch the data obtaining mode from the first data obtaining mode to the second data obtaining mode in response to determining that the terminal device satisfies the switching condition according to the first quantity and the first ratio. As such, data can be obtained with low delay and low power consumption.

Finally, it should be noted that, the foregoing implementations are merely used to illustrate the technical solutions of the disclosure, which however are not intended to limit the disclosure. Although the disclosure has been depicted in detail with reference to the foregoing implementations, those of ordinary skill in the art should understand that, the technical solutions in the foregoing implementations may still be modified, or all or part of technical features in the technical solutions may be equivalently replaced. However, technical solutions corresponding to these modifications or replacements essentially do not depart from the scope of the technical solutions of the implementations of the disclosure.

What is claimed is:

1. A method for data obtaining, performed by a terminal device, the method comprising:

setting a data obtaining mode to a first data obtaining mode;

receiving at least one beacon frame and at least one null frame from a wireless access device;

determining a first quantity according to the at least one null frame received, determining a second quantity according to the at least one beacon frame, and determining a ratio of the first quantity to the second quantity as a first ratio, the first quantity being a number of occurrences of abnormal packet-obtaining scenes; and switching the data obtaining mode from the first data obtaining mode to a second data obtaining mode, in response to determining according to the first quantity and the first ratio that a switching condition is satisfied, the first data obtaining mode referring to obtaining buffered data from the wireless access device based on a power save-poll (PS-Poll) frame, and the second data obtaining mode referring to obtaining buffered data from the wireless access device based on an active null frame.

2. The method of claim 1, wherein the receiving the at least one beacon frame and the at least one null frame from the wireless access device comprises:

receiving the at least one beacon frame from the wireless access device;

transmitting at least one PS-Poll frame to the wireless access device; and receiving the at least one null frame from the wireless access device.

3. The method of claim 1, wherein the determining the first quantity according to the at least one null frame comprises:

incrementing a first counter by 1 in response to a more data bit (MDB) in a null frame in the at least one null frame being 0, wherein the first counter is used to count the abnormal packet-obtaining scenes; and determining the first quantity according to the first counter.

4. The method of claim 1, wherein the determining the second quantity according to the at least one beacon frame comprises:

incrementing a second counter by 1 in response to a beacon frame in the at least one beacon frame containing first traffic indication map (TIM) information, wherein the second counter is used to count beacon frames containing the first TIM information; and determining the second quantity according to the second counter.

5. The method of claim 1, wherein the switching the data obtaining mode from the first data obtaining mode to the second data obtaining mode in response to determining according to the first quantity and the first ratio that the switching condition is satisfied comprises:

determining that the switching condition is satisfied, in response to the first quantity being greater than a quantity threshold and the first ratio being greater than or equal to a ratio threshold; and switching the data obtaining mode from the first data obtaining mode to the second data obtaining mode.

6. The method of claim 1, wherein after switching the data obtaining mode from the first data obtaining mode to the second data obtaining mode, the method further comprises:

transmitting the active null frame to the wireless access device; and receiving a buffer data frame from the wireless access device.

7. A communication device, comprising:

a transceiver;

a processor, coupled with the transceiver; and a memory, coupled with the transceiver and the processor, and storing computer programs;

the computer programs comprising program instructions which are operable with the processor to:

set a data obtaining mode to a first data obtaining mode;

cause the transceiver to receive at least one beacon frame and at least one null frame from a wireless access device;

determine a first quantity according to the at least one null frame received, determine a second quantity according to the at least one beacon frame, and determine a ratio of the first quantity to the second quantity as a first ratio, the first quantity being a number of occurrences of abnormal packet-obtaining scenes; and switch the data obtaining mode from the first data obtaining mode to a second data obtaining mode, in response to determining according to the first quantity and the first ratio that a switching condition is satisfied, the first data obtaining mode referring to obtaining buffered data from the wireless access device based on a power save-poll (PS-Poll) frame, and the second data obtaining mode referring to obtaining buffered data from the wireless access device based on an active null frame.

8. The communication device of claim 7, wherein the transceiver configured to receive the at least one beacon frame and the at least one null frame from the wireless access device is configured to:

receive the at least one beacon frame from the wireless access device;

transmit at least one PS-Poll frame to the wireless access device; and receive the at least one null frame from the wireless access device.

9. The communication device of claim 7, wherein the processor configured to determine the first quantity according to the at least one null frame is configured to:

increment a first counter by 1 in response to a more data bit (MDB) in a null frame in the at least one null frame being 0, wherein the first counter is used to count the abnormal packet-obtaining scenes; and determine the first quantity according to the first counter.

10. The communication device of claim 7, wherein the processor configured to determine the second quantity according to the at least one beacon frame is configured to:

increment a second counter by 1 in response to a beacon frame in the at least one beacon frame containing first traffic indication map (TIM) information, wherein the second counter is used to count beacon frames containing the first TIM information; and determine the second quantity according to the second counter.

11. The communication device of claim 7, wherein the processor configured to switch the data obtaining mode from the first data obtaining mode to the second data obtaining mode in response to determining according to the first quantity and the first ratio that the switching condition is satisfied is configured to:

determine that the switching condition is satisfied, in response to the first quantity being greater than a quantity threshold and the first ratio being greater than or equal to a ratio threshold; and switch the data obtaining mode from the first data obtaining mode to the second data obtaining mode.

12. The communication device of claim 7, wherein the transceiver is further configured to:

transmit the active null frame to the wireless access device and receive a buffer data frame from the wireless access device, after the data obtaining mode is switched from the first data obtaining mode to the second data obtaining mode.

13. A non-transitory computer-readable storage medium storing one or more instructions which, when executed by a processor, cause the processor to carry out actions, comprising:

setting a data obtaining mode to a first data obtaining mode;

receiving at least one beacon frame and at least one null frame from a wireless access device;

determining a first quantity according to the at least one null frame received, determining a second quantity according to the at least one beacon frame, and determining a ratio of the first quantity to the second quantity as a first ratio, the first quantity being a number of occurrences of abnormal packet-obtaining scenes; and switching the data obtaining mode from the first data obtaining mode to a second data obtaining mode, in response to determining according to the first quantity and the first ratio that a switching condition is satisfied, the first data obtaining mode referring to obtaining buffered data from the wireless access device based on a PS-Poll frame, and the second data obtaining mode referring to obtaining buffered data from the wireless access device based on an active null frame.

14. The non-transitory computer-readable storage medium of claim 13, wherein the instructions executed by the processor to carry out the action of receiving the at least one beacon frame and the at least one null frame from the wireless access device are executed by the processor to carry out actions comprising:

receiving the at least one beacon frame from the wireless access device;

transmitting at least one PS-Poll frame to the wireless access device; and receiving the at least one null frame from the wireless access device.

15. The non-transitory computer-readable storage medium of claim 13, wherein the instructions executed by the processor to carry out the action of determining the first quantity according to the at least one null frame are executed by the processor to carry out actions comprising:

incrementing a first counter by 1 in response to a more data bit (MDB) in a null frame in the at least one null frame being 0, wherein the first counter is used to count the abnormal packet-obtaining scenes; and determining the first quantity according to the first counter.

16. The non-transitory computer-readable storage medium of claim 13, wherein the instructions executed by the processor to carry out the action of switching the data obtaining mode from the first data obtaining mode to the second data obtaining mode in response to determining according to the first quantity and the first ratio that the switching condition is satisfied are executed by the processor to carry out actions comprising:

determining that the switching condition is satisfied, in response to the first quantity being greater than a quantity threshold and the first ratio being greater than or equal to a ratio threshold; and switching the data obtaining mode from the first data obtaining mode to the second data obtaining mode.

17. The non-transitory computer-readable storage medium of claim 13, wherein the instructions are further executed by the processor to carry out actions comprising:

after switching the data obtaining mode from the first data obtaining mode to the second data obtaining mode, transmitting the active null frame to the wireless access device; and receiving a buffer data frame from the wireless access device.

18. The non-transitory computer-readable storage medium of claim 13, wherein the instructions executed by the processor to carry out the action of determining the second quantity according to the at least one beacon frame are executed by the processor to carry out actions comprising:

incrementing a second counter by 1 in response to a beacon frame in the at least one beacon frame containing first traffic indication map (TIM) information, wherein the second counter is used to count beacon frames containing the first TIM information; and determining the second quantity according to the second counter.

* * * * *